United States Patent [19]

McKenna et al.

[11] Patent Number: 5,128,156
[45] Date of Patent: Jul. 7, 1992

[54] PROCESS FOR PREPARING AN ALTERNATE PROTEIN SOURCE FOR COFFEE WHITENERS AND OTHER PRODUCTS

[75] Inventors: Ronald J. McKenna, Camillus; David J. Keller, Syracuse; Delmar L. Andersen, Baldwinsville, all of N.Y.

[73] Assignee: Borden, Inc., Columbus, Ohio

[21] Appl. No.: 616,909

[22] Filed: Nov. 21, 1990

[51] Int. Cl.$^5$ .............................................. A23C 9/12
[52] U.S. Cl. ........................................ 426/43; 426/42; 426/580; 426/657
[58] Field of Search ............... 426/42, 43, 602, 657, 426/580

[56] References Cited

U.S. PATENT DOCUMENTS 4,689,245  8/1987  Kosikowski et al. ............... 426/657
4,713,254  12/1987  Childs et al. ........................ 426/657
4,734,287  3/1988  Singer et al. ........................ 426/602
4,784,865  11/1988  Baker et al. ........................ 426/602

OTHER PUBLICATIONS

Fennema, O. R., Food Chemistry, 1983, pp. 356–358, 430–431, Marcel Dekker, Inc. N.Y.

Primary Examiner—Joseph Golian
Assistant Examiner—Leslie Wong
Attorney, Agent, or Firm—Dennis H. Rainear

[57] ABSTRACT

The invention relates to a dried, high protein food product derived from phosphate-modified milk protein concentrate (MPC) rather than from casein. The high protein food product is preferably spray dried, and is useful as a non-feathering coffee whitener. The non-feathering and spray drying properties are the results of the inclusion of a phosphate salt.

17 Claims, No Drawings

PROCESS FOR PREPARING AN ALTERNATE PROTEIN SOURCE FOR COFFEE WHITENERS AND OTHER PRODUCTS

BACKGROUND OF THE INVENTION

Neutralized casein, or caseinate, is a common protein source for certain food products. As the availability of acid casein declines, or the cost increases, an alternate source of protein is desirable for these food products. Alternate sources of protein have included vegetable bases such as soy and cottonseed, ultrafiltered skim milk retentates, and demineralized sweet whey.

Milk protein concentrate (MPC) is a protein source also used in various food products, such as coffee whiteners, for example. MPC, however, is generally a very viscous product, requires refrigeration, and has a total solids content of approximately 30%. MPC is conventionally produced by fermentation of skim milk and is shipped wet, i.e., at a relatively high moisture content. This has an undesirable impact on shipping costs. The very high viscosity of MPC also makes pumping very difficult and accelerates equipment failure. It would therefore be desirable to have a protein-rich material which could be shipped dry and later re-hydrated at the site of use.

Powdered coffee whiteners typically have the following composition:

| | |
|---|---|
| Fat (edible) | 17–51% |
| Corn syrup solids | 35–70% |
| Sodium Caseinate | 1–5.5% |
| Emulsifier | 0.5–1.5% |
| Stabilizer | 0–1.3% |
| Stabilizing Salt (Buffers) | 0.8–3.5% |
| Color + Flavor | 0–3.0% |

Stabilizing salts (buffers) usually include dipotassium phosphate, disodium phosphate, or sodium citrate.

The stabilizer is desirable for producing proper mouth-feel and viscosity in liquid coffee whiteners as well as in powdered coffee whitener compositions when low caseinate levels are used. Conventional stabilizers include carrageenan and other vegetable gum (e.g., gum arabic, xanthan gum).

Known spray dried coffee whiteners, however, are not derived from fermentation or from milk protein concentrate. The protein usually employed in dried coffee whiteners is sodium caseinate.

Due to the high viscosity of conventional MPC, the increasing cost and decreasing availability of casein, and the expenses of shipping and refrigeration, there exists a need for a powdered, shelf stable, non-refrigerated, high protein food product.

SUMMARY OF THE INVENTION

The invention relates to a process for preparing a powdered, high protein food product derived from phosphate modification of MPC. The invention further relates to a powdered, high protein food product derived from MPC. The high protein food product is produced by drying a slurry of MPC to which has been added a phosphate salt.

In one embodiment of the present invention, a process is provided for preparing a powdered, high protein food product comprising the steps of:

(a) incubating a mixture of skim milk and starter culture for a period of time sufficient to ferment the mixture, produce a water insoluble protein-rich material, and drop the pH of the mixture below about 4.80;

(b) separating the insoluble protein-rich material (MPC) from the soluble portion of the fermented mixture in step (a);

(c) adding phosphate salt to the insoluble protein-rich material from step (b); and, (d) drying the phosphate salt/protein-rich product of step (c) to produce a powder with a total protein content greater than 60% by weight, wherein the powder has a non-refrigerated shelf life of greater than ten months.

In a preferred embodiment, the drying of step (d) is achieved by spray drying the product of step (c).

In another embodiment of the present invention, a spray dried high protein food product is produced which exhibits non-refrigerated shelf life exceeding at least ten months and preferably exceeding twelve months, has a total solids content exceeding 95 weight percent, and has at least 40 and preferably 60 percent by weight protein. Preferably, the product does not exhibit free oil or "feathering" when used in a coffee whitener. "Feathering" herein means the appearance of streaks of light color observed in coffee whitened by a food product with destabilized protein coagulation. "Feathering" is also a term used in the art and herein to describe the situation where the protein contacts substantial concentrations of coffee, tea and similar beverages and thereafter precipitates, aggregates or becomes insoluble.

It has been surprisingly discovered that the addition of one or more phosphate salts to a protein-rich slurry derived from the incubation or fermentation of a mixture of skim milk and a starter culture facilitates the spray drying of the slurry to form a powdered, high protein-containing food product. This food product is ideal in a non-feathering coffee whitener. Without the addition of the phosphate salt to MPC to form the slurry, the viscosity of the MPC is generally too high to be easily spray dried. Additionally, coffee whitener produced from a slurry prepared in the absence of phosphate salt exhibits undesirable feathering. Upon addition of a sufficient amount of phosphate salt to the slurry, the apparent viscosity of the slurry is significantly reduced, and a pumpable or sprayable phosphate-modified MPC material is produced. Coffee whitener produced from this spray dried material does not exhibit undesirable feathering.

DETAILED DESCRIPTION OF THE INVENTION

According to the present invention, a spray dried, high protein-containing food product is derived from MPC. This is achieved by first incubating or fermenting a mixture of skim milk and acid-producing starter culture for a period of time sufficient to drop the pH of the mixture below 4.80 and preferably below 4.65. This causes a protein-rich material to precipitate from the mixture.

More specifically, in the preparation of MPC, fresh skim milk is preferably pasteurized by heating to 195°–205° F. for at least three minutes and then cooled to 80°–90° F. The fat and protein contents of the skim milk are not critical to the present invention. To this pasteurized milk is added an acid producing (preferably lactic acid) starter bacterial culture such as, but not limited to, Hansén Redi Set Lactic Culture. Other culture starters known in the art for incubating dairy products are also operative herein. The amount of starter culture added is preferably 2% by weight or more, based on the weight of skim milk. Small amounts of rennet can also be added to the starter. Also added to the culture is a culture media, such as phase IV media available from Oregon State University. The mixture of skim milk and starter culture is stirred preferably at a temperature of above 80° F., and more preferably of 86°-90° F., until the pH of the mixture drops from its initial level to a pH of below about 4.8 and preferably from 4.5 to 4.7. The pH drop, which may require up to 16 hours, is the result of lactic acid formation by the starter bacterial culture and results in the production of an insoluble protein-rich curd material. The liquid remaining in the mixture contains soluble whey. The mixture is then preferably heated to 110°140° F. and, using separation techniques, such as, for example, decanting and/or centrifugation, the protein-rich insoluble curd material is separated from the soluble whey and fluid fraction. From the incubated or fermented mixture is separated a protein-containing white curd portion by any conventional technique including, but not limited to, filtration, pressing, and decanting. The separation generally separates the mixture into an insoluble protein-containing curd portion and a soluble whey-containing portion. In a preferred embodiment, the separation is achieved by centrifugation followed by decantation. By this means, the whey-containing portion is in the supernatant and the protein-containing curd portion is in the residue. Preferably the protein-rich material has a total solids level greater than 15% by weight and more preferably greater than 25%. The insoluble protein-rich MPC material thus separated is approximately 20-30% protein. The MPC product is a thick, cheesy curd-like material which is too viscous to be readily pumped, and therefore cannot be spray dried.

To the protein-rich material separated from the incubated mixture is added with mixing an amount of at least one phosphate salt sufficient to form a slurry. The phosphate salt can be a monophosphate or orthophosphate, such as $NaH_2PO_4$ or $Na_2HPO_4$ or $Na_3PO_4$, or condensed polyphosphates, such as metaphosphates, like $Na_3P_3O_9$ or $Na_4P_4O_{12}$, and the like. The preferred phosphate salt is selected from the group consisting of dipotassium phosphate, sodium aluminum phosphate, disodium phosphate, trisodium phosphate, tetrasodium pyrophosphate, sodium tripolyphosphate, sodium hexametaphosphate, tetrasodium diphosphate and the like or mixtures thereof and is added in an amount sufficient to reduce the viscosity of the slurry to a pumpable and/or sprayable level.

An effective amount of phosphate salt in the present invention is also that amount needed to produce a product which when dried will not feather when used in a coffee whitener. Thus, the amount of phosphate salt to be added to the protein-rich material is generally from about 1.0 weight percent to about 10.0 weight percent, and preferably from about 2.1 to about 4.1 weight percent based on the total weight of the slurry. The effective amount will vary depending on the type or types of phosphates used, and the desired properties of the resulting food product.

Thus, in a preferred embodiment of the present invention, 0.5 weight percent of sodium tripolyphosphate and 3.0 weight percent of dipotassium phosphate is mixed thoroughly into MPC (prepared as described herein) by means of a high speed mixer (e.g., a liquifier) to produce a slurry with a pumpable and sprayable viscosity. The slurry is then spray dried to produce a high protein, shelf stable, low moisture (e.g., 5.0% by weight), powdered food product useful, for example, in a coffee whitener.

In another preferred embodiment, the slurry can further comprise a protease enzyme. Thus, the slurry can be reheated, for example, to about 120° F. and treated with a protease enzyme which has been presoaked in warm or hot water for 10 to 20 minutes. The preferred amount of enzyme to be added is 0.0003 to 0.003 Anson units per gram of protein. The pH of the slurry is then maintained in the 5.0-7.0 range by the addition of, for example, sodium hydroxide or citric acid, or other known food grade acids or bases. The slurry plus enzyme is maintained at an elevated temperature, preferably 110°-125° F. for 15 to 20 minutes or until the MPC/phosphate salt/enzyme slurry has thinned to a desired viscosity.

A preferred protease enzyme is NOVOZYME 89, a fungal protease derived from the fermentation of a selected strain of *Mucor miehei*, and available from Novo Laboratories, Inc., Danbury, Conn. It is available in liquid form with an activity of 0.24 Anson units per gram. One Anson unit (AU) is the amount of enzyme which under standard conditions digests hemoglobin at an initial rate liberating per minute an amount of TCA-soluble product which gives the same color with phenol reagent as one milliequivalent of tyrosine. NOVOZYME 89 selectively hydrolyzes dairy proteins without the bitterness associated with random, excessive proteolysis.

The slurry can be, but need not be, homogenized prior to or after the addition of the phosphate salt or other treatment. Homogenization is useful in improving the uniformity of the slurry and thus improves the uniformity of the dried product. Homogenization when used can be achieved by, for example, a single pass or double pass treatment through conventional homogenization equipment under standard conditions.

To the slurry can also be added various additives, such as food additives including, for example, vitamins, flavorants, colorants, and the like, or processing aids, such as titanium dioxide or calcium hydroxide.

The slurry comprising the phosphate salt and the protein-rich material portion, and optionally the protease enzyme, is mixed, optionally filtered, and then dried to produce a powder. Any conventional drying technique is useful herein including freeze drying, drum drying, microwave drying, spray drying, vacuum drying and the like. In a preferred embodiment, the slurry is spray dried using conventional spray dry equipment and technology. The preferred moisture content of the dried high protein food product is less than 7 weight percent and preferably less than 5.0 weight percent. In this manner is produced a powdered, high protein food product.

The protein content of the dried powder produced by the present invention is preferably at least 40% by weight and preferably 60-75% by weight. The fat content of the phosphate-modified dried MPC powder is less than 1.5% by weight, preferably 1.2% or less.

In the incubation of the mixture comprising skim milk and starter culture, it is beneficial to add at least one lactase enzyme. Conventional lactase enzymes are known to those skilled in the art and all are operative herein. One lactase enzyme is Pfizer Neutral Lactase concentrate prepared from an extract of *Candida*

*pseudotropicalis*. The lactase enzyme is added to the mixture of skim milk and starter culture in an amount sufficient to accelerate the reduction of the amount of lactose by hydrolysis. This amount can vary but could, for example, be from 0.026 to 0.060% volume/volume, depending on the extent of hydrolysis desired. A particularly preferred embodiment of the present invention utilizes 0.31 to 0.6 weight percent of Pfizer Neutral Lactase concentrate as the lactase enzyme added to the incubating mixture.

By the process of the present invention is thus produced from MPC a phosphate-modified, protein-rich, dried food product useful as, for example, a coffee whitener. With the addition of fat and corn syrup solids, a preferred powdered coffee whitener formulation according to the invention contains, for example and not by limitation:

| | |
|---|---|
| Fat (edible) | 15–51% |
| Corn syrup solids | 35–70% |
| Phosphate modified MPC, (dried) | 2–6% |
| Flavors and colorants | (as desired) |
| Buffer salts | 1–2% |

Unlike prior art coffee whiteners, conventional stabilizers are not required in coffee whiteners produced from the product of the present invention since mouthfeel has been improved by the present process.

When used as a protein source in a coffee whitener formulation, the powdered product of the present invention does not feather or exhibit free oil, readily disperses in the coffee, provides a flavor possessing a dairy (milk) note since the product is derived by fermentation rather than conventional acidification, and provides a sensation of more body. The stability properties, as measured by flavor retention, aroma, and inhibition of microbial growth, are excellent, and non-refrigerated shelf life of greater than ten months is also obtained.

The powdered product produced above was used in a coffee whitener formula in which the phosphate-containing high protein powder replaced sodium caseinate at a 100% substitution level. A coffee whitener formulation (Prototype A) of the present invention was prepared with phosphates and another coffee whitener formulation (Prototype B) was prepared with no added phosphates. These coffee whitener formulations were evaluated, separately and also blended, in hot coffee made from instant coffee. The coffee whitener formulation containing no added phosphates (Prototype B) exhibited unacceptable feathering in coffee. The inventive whitener (Prototype A) containing the phosphates exhibited no feathering.

Below is a table showing the results of blending the two formulas.

| Prototype A Weight % | Prototype B Weight % | Observations in Coffee |
|---|---|---|
| 0 | 100 | Severe feathering |
| 25 | 75 | Severe feathering |
| 30 | 70 | Moderate feathering |
| 40 | 60 | Slight feathering |
| 50 | 50 | No feathering-acceptable |
| 100 | 0 | No feathering |

Comments:
Coffee - 2 grams Maxwell House Instant Coffee in 185 mls of 195–210° F. water
Coffee whiteners. 4 grams Blending Prototype A in excess of 50% by weight with Prototype B produced a whitener that was functional and acceptable in coffee.

The product of this invention can be blended with other foods or food additives such as dried eggs or dried cheese. In addition, the dried high protein product of the present invention can be supplemented with various food additives or process aids. These can include, for example, but are not limited to, sugar, partially hydrogenated oil or oils, vitamins, minerals, corn syrup solids, dextrin, tripotassium citrate, sodium caseinate, natural and artificial flavors, mono- and diglycerides, silicon dioxide, trisodium citrate, lecithin, riboflavin, beta carotene and carrageenan, and mixtures thereof.

The powdered, high protein product derived by the present invention from MPC can be combined with coffee whitener or other food products derived from casein, soy protein, sweet whey, and other protein sources. Some products may require a reduction in ash content which can be achieved in the materials of the present invention by use of techniques known to those skilled in the art, e.g. reverse osmosis-type filtration of the skim milk starting material.

Thus by the present invention, a non-feathering coffee whitener is provided comprising sugar, fat, an emulsifier, and a powdered, high protein food product derived from MPC and a phosphate salt as described above. The coffee whitener preferably contains at least 2.0 weight % of the powdered high protein food protein food product.

In addition to utility in a coffee whitener, the product of the present invention is useful in infant formulas, whipped food products, cheese products, dried cheese powder products and other foods requiring or desiring protein fortification. A significant cost savings is attainable as a result of the present invention because the dried protein-rich powdered food product can be shipped at much lower freight costs than the costs of shipping wet MPC. The dried powder can then be rehydrated by the user to produce the various protein-enhanced food products. Thus, for example, a cheese powder product is produced by the present invention by incubating the mixture of skim milk and a starter culture with an enzyme or microbial coagulase having proteolytic activity. This is preferably done at a temperature of from 80 to 120 degrees Farenheit. The incubation produces proteolysis and thinning of the mixture as the pH drops to 4.8 or below. To this material can be added one or more of the phosphate salts described above and the resulting slurry dried to produce a cheese powder product, with a non refrigerated shelf life exceeding 12 months.

That which is claimed is:
1. A process for preparing a powdered, high protein food product comprising:
   (a) incubating a mixture of skim milk and starter culture for a period of time sufficient to ferment the mixture and drop the pH of the mixture below 4.80 whereby a water-insoluble protein-rich material is produced;
   (b) separating the insoluble protein-rich material from the fermented mixture in step (a);
   (c) adding phosphate salt to the insoluble protein-rich material from step (b) to form a slurry; and,
   (d) drying the slurry of step (c) to produce a powder with a total protein content greater than 40% by weight, wherein the powder has a non-refrigerated shelf life of greater than ten months.

2. The process of claim 1 wherein the pH of step (a) drops to the range from 4.5 to 4.7.

3. The process of claim 1 wherein the separation step of step (b) is achieved by centrifugation followed by decanting.

4. The process of claim 1 wherein the protein-rich material separated in step (b) has a total solids level of greater than 15%.

5. The process of claim 1 wherein the drying in step (d) is achieved by spray drying the product of step (c).

6. The process of claim 1 wherein the phosphate salt is selected from the group consisting of dipotassium phosphate, sodium aluminum phosphate, disodium phosphate, trisodium phosphate, tetrasodium pyrophosphate, sodium hexametaphosphate, sodium tripolyphosphate, and tetrasodium diphosphate and is added at a level sufficient to produce a sprayable viscosity.

7. The process of claim 1 wherein the phosphate salt is added in step (c) at a level of from 2.0 to 4.1% by weight.

8. The process of claim 1 wherein the product of step (d) has less than 1.5 percent by weight fat.

9. The process of claim 1 wherein the moisture content of the powdered product of step (d) is less than about 5 weight percent.

10. The process of claim 1 wherein the starter culture of step (a) is selected from the group consisting of acid-producing bacteria cultures.

11. The process of claim 1 wherein the incubation of step (a) is performed at a temperature of from 80° to 90° F.

12. The process of claim 1 further comprising the step of homogenizing the product of step (c) before drying.

13. The process of claim 1 wherein the process further comprises the addition to the mixture in step (a) of a lactase enzyme.

14. The process of claim 13 wherein the lactase enzyme is *Candida pseudotropicalis* and is added to the mixture in step (a) in an amount sufficient to accelerate the hydrolysis of lactose.

15. The process of claim 1 wherein the dried product has a total protein content of 60 to 75% by weight.

16. An improved process for preparing a spray dried high protein food produced by
  (a) incubating a mixture of skim milk, a lactase enzyme, and starter culture for a period of time sufficient to drop the pH of the mixture below 4.80;
  (b) separating a protein-rich material from the mixture in step (a), wherein the improvement comprises combining an amount of at least one phosphate salt with the separated protein-rich material, and then spray drying the combination to produce a powdered product having greater than 40% by weight protein, and which has non-refrigerated shelf life exceeding ten months.

17. The improved process of claim 16 wherein the phosphate salt is selected from the group consisting of dipotassium phosphate, tetrasodium pyrophosphate, sodium hexametaphosphate, sodium tripolyphosphate, wherein the salt is present in an amount sufficient to reduce the viscosity of the combination.

* * * * *